No. 11,728.

Reissued Mar. 28, 1899.

W. H. PRINZ.

APPARATUS FOR DRYING MALT.

(Application filed June 3, 1898.)

2 Sheets—Sheet 1.

Witnesses
W. C. Collier
Erwin J. Lotz

Inventor
William H. Prinz
By Rudolph Ruth Lotz
Atty

THE NORRIS PETERS CO., PHOTO-LITHO., WASHINGTON, D. C.

No. 11,728.

W. H. PRINZ.

Reissued Mar. 28, 1899.

APPARATUS FOR DRYING MALT.

(Application filed June 3, 1898.)

2 Sheets—Sheet 2.

Witnesses,
W. C. Coles
Erwin J. Lotz

Inventor
William H. Prinz
By Rudolph Wm. Lotz
Atty.

THE NORRIS PETERS CO., PHOTO-LITHO., WASHINGTON, D.

UNITED STATES PATENT OFFICE.

WILLIAM H. PRINZ, OF CHICAGO, ILLINOIS, ASSIGNOR TO THE SALADIN PNEUMATIC MALTING CONSTRUCTION COMPANY, OF SAME PLACE.

APPARATUS FOR DRYING MALT.

SPECIFICATION forming part of Reissued Letters Patent No. 11,728, dated March 28, 1899.

Original No. 580,672, dated April 13, 1897. Application for reissue filed June 3, 1898. Serial No. 682,507.

*To all whom it may concern:*

Be it known that I, WILLIAM H. PRINZ, a citizen of the United States, residing at Chicago, in the county of Cook and State of Illinois, have invented certain new and useful Improvements in Apparatus for Drying Malt; and I do hereby declare the following to be a full, clear, and exact description of the invention, such as will enable others skilled in the art to which it appertains to make and use the same.

My invention relates to a novel construction in a malt-kiln or apparatus for drying malt, the object being to provide a device of this description in which the hot air is freed from the fine ashes usually carried thereby and in which means are provided for regulating the hot-air currents to most effectually dry the malt; and it consists in the features of construction and combinations of parts hereinafter fully described and claimed.

Figure 1:
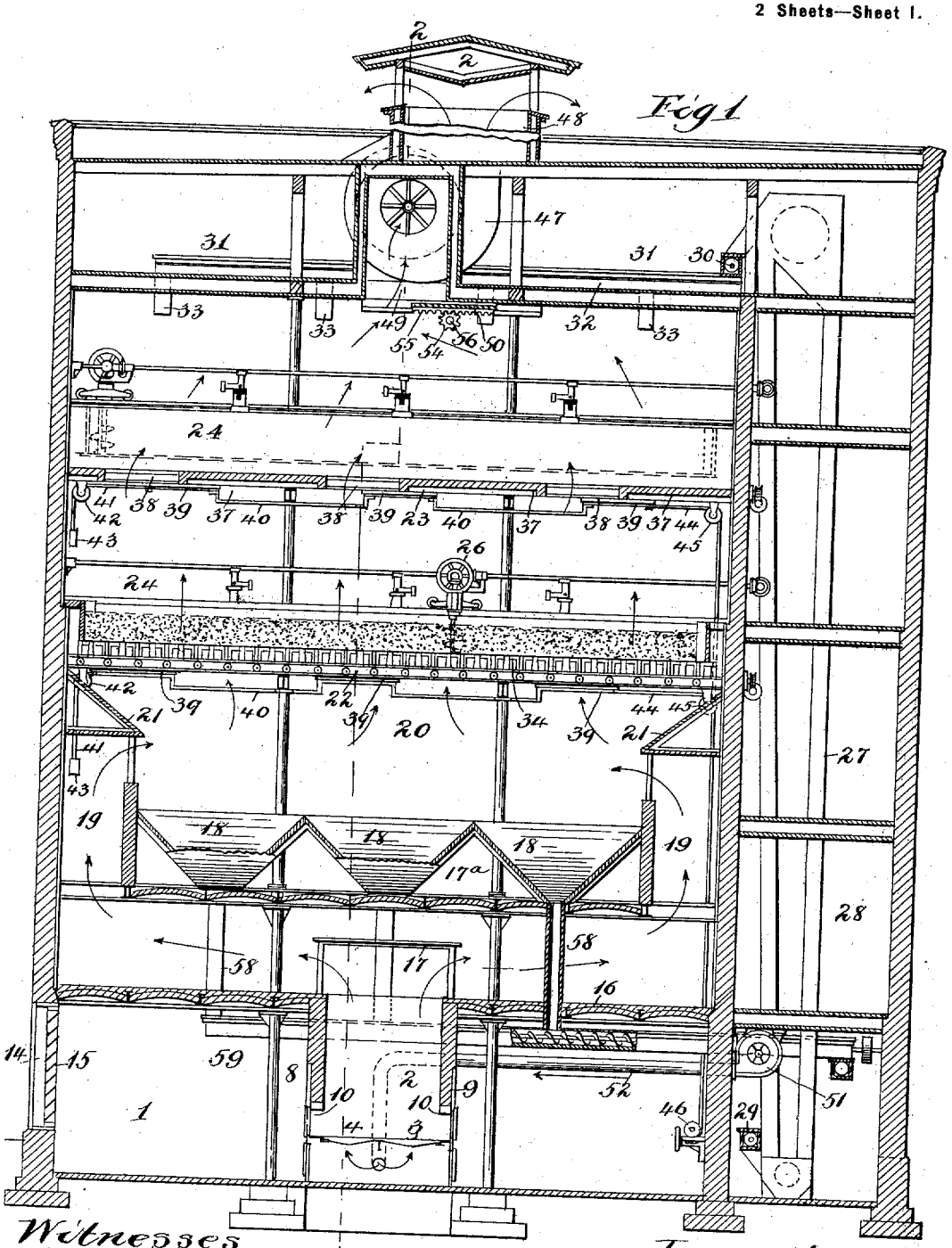
Figure 2:
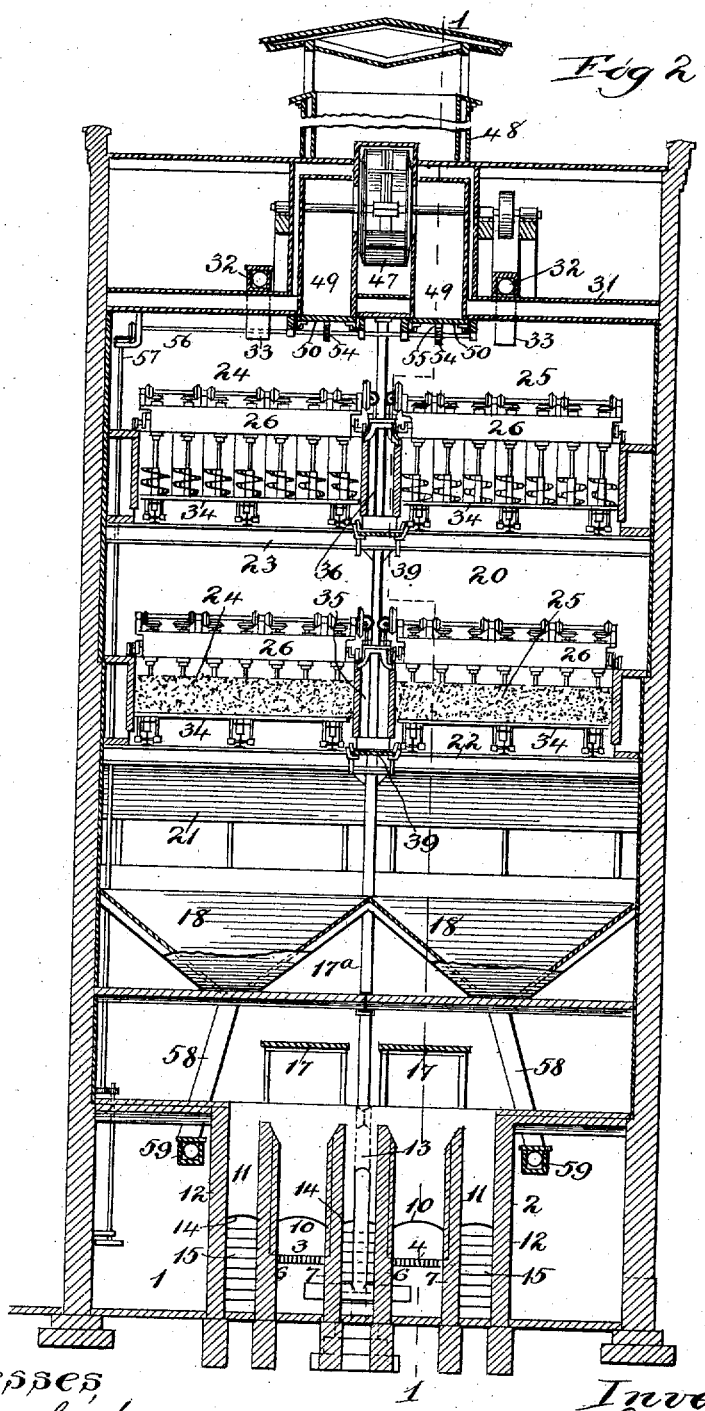

In the accompanying drawings, illustrating my invention, Figure 1 is a vertical longitudinal section of a malt-kiln constructed in accordance with my invention, taken on the line 1 1 of Fig. 2. Fig. 2 is a vertical transverse section of the same, taken on the line 2 2 of Fig. 1.

The first or lowest floor 1 of my malt-kiln contains the furnace 2, which is of the usual construction employed in malt-kilns, consisting of two grates 3 and 4, extending between side walls 6 and 7 and end walls 8 and 9. Openings 10 in said end walls 8 and 9 permit the passage of air over said grates, which is heated thereby and rises into the kiln. Spaces 11 are left between the outer walls of said furnace and walls 12 beyond the same, through which cool air is admitted into the kiln to mix with the hot air and regulate the temperature thereof. A space 13 is also left between the inner walls of said furnace for the passage of cool air, said air being admitted through openings 14 in said end walls 8 and 9, which are adapted to be regulated by blinds 15. The exit of said furnace is on the second floor 16, a deflector 17 being provided above said floor and below the ceiling thereof to prevent the heated air from impinging directly against said ceiling for obvious reasons.

In malt-kilns now generally in use the furnace opens directly into the space below the lowermost perforated floor of the kiln, the hot air passing directly through said floor. The hoppers which receive the dry malt from the lowermost perforated floor of said kiln are situated below the exit of the furnace, in which a very hot fire is always kept. The air-currents passing through said furnace are very strong and carry fine particles of ashes with them in their passage. These particles of ashes afterward fall into said hoppers, owing to the decreased strength of said air-currents in the large space above the furnace, and when the dry malt is dumped into the same mix with the latter. This is obviously very objectionable, and to overcome this objection I provide a hopper-floor 17 above said floor 16, upon which the hoppers 18 are situated. At each end of said floor 17 I provide passages 19, through which the air after its horizontal passage between said floors 16 and 17 passes upwardly into the drying-chamber 20. An inclined hood 21 is provided above each of said passages 19 to prevent the malt from dropping through said passages. During the horizontal passage of the air over what I term the "ash-floor" 16 the ashes held in suspension thereby will subside, owing to the decreased speed of the air-current in the larger space and the absence of upward impulse. In this manner the ashes will obviously be prevented from passing into said drying-chamber 20, and consequently the hoppers kept clear of the same. Said drying-chamber 20 is provided with two or more compartment-floors 22 and 23, which are provided with compartments 24 and 25 similar to the compartments of malt-houses constructed in accordance with the Saladin-Prinz system. Agitating-machines 26 are also placed in these compartments to loosen the malt for the freer passage of the air therethrough.

In malt-kilns as at present constructed and the process of drying as at present carried out the finished malt is dumped upon the uppermost floor and when it has reached a certain stage of dryness is dumped upon the next lower floor and thence upon the lowest, where it is finally dried. Thus there are usually three loaded floors in different stages, the lowermost being dryest and the uppermost the wettest.

The best results are obtained by first withering the malt upon the uppermost floor, which requires a greater volume of air than can pass through the malt upon the lower floors, and this air should also be perfectly dry and of somewhat lower temperature than is required for the further process of drying, as a high temperature is very injurious to the saturated malt. For these reasons a separate floor has often been employed, upon which the malt was first loaded and withered. This, however, requires additional handling of the malt and the expense of such an additional floor.

It is also desirable that previous to the removal of the dry malt from the lowermost floor it be subjected for a short time to the action of a very hot current of air to finish the drying. This extra-hot air-current is, however, very injurious to the undried malt upon the upper floors, and for this reason it is usually entirely dispensed with or passed through for an exceedingly short and insufficient length of time.

In my malt-house I provide means for overcoming these objections, as hereinafter decribed. As usual, I provide means for transporting and elevating the malt, consisting of an elevator 27, situated in the elevator-shaft 28, which is fed by a conveyer 29, leading from the malt-house, and delivers said malt into a conveyer 30 on the uppermost floor 31 of said malt-house. Conveyers 32 receive the malt from said conveyer 30 and drop the same into the upper compartments 24 and 25 through spouts 33. The agitating-machines in said compartments serve to spread said malt evenly within the same. Said compartments 24 and 25 are provided with perforated dumping-floors 34 of ordinary construction, the space below the same being perfectly free to admit of the free access of the air thereto. Aisles 35 and 36 are formed between each pair of said compartments 24 and 25 and are provided with floors 37, having openings 38 therein adapted to be closed by valves 39. Said valves 39 are movably mounted in guides below said floors 37 and are connected with each other by rods 40, extending from the end of one valve to the nearest end of the adjacent valve. A cable 41 is connected with the end of one of the end valves 39 and is trained over a pulley 42, adjacent the end of the aisle, and is provided with a weight 43 at its other end to hold said valves normally over said openings 38 to close the same. A cable 44, attached to the other endmost valve, is trained over a pulley 45 and is connected at its other end to a reel 46 in the lowest story, which is operated by suitable devices to operate said valves against the action of said weight 43.

To provide for a strong draft in said kiln, I employ a suction-fan 47, situated on the uppermost floor 31, whose delivery end is connected with the stack 48. A passage 49, adapted to be closed by a valve 50, connects the inlet end of said suction-fan with said drying-chamber 20. A small blower 51, situated in the elevator-shaft, is connected by a pipe 52 with the spaces underneath the grates of said furnace for obvious reasons.

By means of my construction I am enabled to prevent the passage of the air-currents through the malt upon any of the floors of the kiln and to so control said air-currents that they will pass either through the malt upon all the floors or through the malt upon one floor only or only a small amount through the malt on one floor and the whole current through the malt on the other floor. When it is desired to wither the malt upon the uppermost floor, the valves 39 are withdrawn from the openings 38 in the aisles of the lower floors and the said openings 38 in the upper floor closed. In this manner the air is caused to avoid the malt upon the lower floors and to pass through said openings 38 therein and through the body of the malt on the upper floor, which it reaches in a perfectly-dry condition. When it is desired to pass a very hot current through the malt on the lowest floor for the purpose of finishing the drying previous to the removal of the same and to prevent said hot air from passing through the undried malt upon the upper floors, the openings 38 in the lower floor are closed and the valves in the upper floors opened, so that the hot air passing through the body of the malt on the lowest floor will pass through said openings in the upper floors and avoid the malt thereon. By partially opening said valves on all floors the volume of air passed through the malt may be regulated according to the judgment of the maltster.

I have found that the use of a suction-fan is also very advantageous, as when the malt is saturated it clings so closely together as to offer great resistance to the passage of air. After the malt has reached a certain stage of dryness the resistance is so far decreased as to make the use of a fan unnecessary. To shut off said fan at this time, the passage 49, which is controlled by the valve 50, is closed, said valve 50 being operated by means of a pinion 54, engaging a rack 55 on said valve. Said pinion 54 is mounted upon a shaft 56, which is geared to a vertical shaft 57 by means of bevel-gears. Said shaft 57 extends downwardly and is operated from the ground floor of the kiln.

After the malt is completely dried it is dumped into the hoppers and passes through spouts 58, leading therefrom into a conveyer 59, which transports it to the elevator.

In the drawings I have shown only two malt-floors; but it will of course be understood that this number may be increased without departing from the spirit of my invention.

I claim as my invention—

1. In an apparatus for drying malt, a hopper-floor, a furnace having its exit below said hopper-floor and practically under the middle portion thereof, a floor around said furnace, draft-passages between said hopper-floor and said floor around said furnace, openings in said hopper-floor adjacent the walls of said kiln, and hoods above said openings.

2. In an apparatus for drying malt, a malt-floor divided into compartments, and openings in said floor between said compartments, said openings being controlled by valves.

3. In an apparatus for drying malt, a horizontal air-passage below the hoppers, malt-floors above said hoppers, and valve-controlled openings in said malt-floors.

4. In an apparatus for drying malt, a hopper-floor, a floor below said hopper-floor, upon which ashes carried by the heated air are adapted to subside, a malt-floor above said hopper-floor, and valve-controlled openings in said malt-floor.

5. In an apparatus for drying malt, a hopper-floor, air-passages below said hopper-floor in which the air is adapted to be freed from ashes, malt-floors above said hopper-floor, valve-controlled openings in said malt-floors, a suction-fan above said malt-floors, and a valve-controlled air-passage leading to said suction-fan.

In testimony whereof I affix my signature in presence of two witnesses.

WILLIAM H. PRINZ.

Witnesses:

RUDOLPH WM. LOTZ,

ERWIN J. LOTZ.